(12) United States Patent
Lohbihler

(10) Patent No.: US 10,222,176 B2
(45) Date of Patent: Mar. 5, 2019

(54) SIMULATED GUN SHOOTING AND TARGET POSITION SENSING APPARATUS AND METHOD

(71) Applicant: Andrew Lohbihler, Waterloo (CA)

(72) Inventor: Andrew Lohbihler, Waterloo (CA)

( * ) Notice: Subject to any disclaimer, the term of this patent is extended or adjusted under 35 U.S.C. 154(b) by 637 days.

(21) Appl. No.: 14/285,301

(22) Filed: May 22, 2014

(65) Prior Publication Data
US 2014/0349254 A1 Nov. 27, 2014

Related U.S. Application Data

(60) Provisional application No. 61/826,213, filed on May 22, 2013.

(51) Int. Cl.
| | |
|---|---|
| F41G 3/26 | (2006.01) |
| G01C 3/08 | (2006.01) |
| F41A 33/02 | (2006.01) |
| F41G 5/02 | (2006.01) |
| G01S 5/16 | (2006.01) |
| F41J 5/14 | (2006.01) |
| A63F 13/837 | (2014.01) |
| A63F 13/245 | (2014.01) |
| A63F 13/219 | (2014.01) |

(52) U.S. Cl.
CPC .......... *F41G 3/2655* (2013.01); *A63F 13/219* (2014.09); *A63F 13/245* (2014.09); *A63F 13/837* (2014.09); *F41A 33/02* (2013.01); *F41G 3/2627* (2013.01); *F41G 3/2677* (2013.01); *F41G 5/02* (2013.01); *F41J 5/14* (2013.01); *G01C 3/08* (2013.01); *G01S 5/163* (2013.01)

(58) Field of Classification Search
CPC .......... F41A 33/00; F41A 33/02; F41A 33/04; F41A 33/06; F41G 3/26; F41G 5/02; A63F 13/219; A63F 13/245; A63F 13/837; F41J 5/14; G01C 3/08; G01J 5/163
See application file for complete search history.

(56) References Cited

U.S. PATENT DOCUMENTS

| | | | |
|---|---|---|---|
| 4,395,045 A | 7/1983 | Baer | |
| 5,716,216 A * | 2/1998 | O'Loughlin | ............... F41J 5/02 273/365 |
| 6,323,838 B1 | 11/2001 | Thanasack et al. | |

(Continued)

*Primary Examiner* — Timothy A Musselman
(74) *Attorney, Agent, or Firm* — Global Intellectual Property Agency, LLC; Daniel Boudwin

(57) ABSTRACT

The present invention comprises a transmitter unit having at least one infrared (IR) transmitter, a target screen, a plurality of photodiode sensors disposed in a spaced apart relationship about the target screen, and receiver circuitry connecting the photodiode sensors together. The transmitter unit continuously emits an IR signal, which is detected by the photodiode sensors. The receiver circuitry then triangulate the position of the transmitter unit by calculating the differential distances between each of the photodiode sensors and the transmitter unit. The receiver circuitry is able to dynamically update the position of the transmitter unit because the transmitter unit continuously emits an IR signal. The transmitter unit is able to simulate a "shot" in a number of different ways, including updating the packet update rate or altering the data packet preamble. No return signal is necessary for the transmitter unit to confirm the "shot."

20 Claims, 6 Drawing Sheets

(56) References Cited

U.S. PATENT DOCUMENTS

| | | | |
|---|---|---|---|
| 6,540,607 B2 | 4/2003 | Mokris et al. | |
| 6,929,548 B2 | 8/2005 | Wang | |
| 7,301,530 B2* | 11/2007 | Lee | G06F 3/043 |
| | | | 345/156 |
| 7,413,514 B2* | 8/2008 | Saikawa | A63F 13/005 |
| | | | 434/16 |
| 8,157,651 B2 | 4/2012 | Ohta et al. | |
| 8,164,567 B1 | 4/2012 | Barney et al. | |
| 9,250,039 B2* | 2/2016 | Matthews | F41G 3/2655 |
| 9,255,986 B2* | 2/2016 | Deliwala | A63F 13/06 |
| 2007/0190494 A1* | 8/2007 | Rosenberg | A63F 13/12 |
| | | | 434/11 |
| 2008/0070684 A1* | 3/2008 | Haigh-Hutchinson | |
| | | | A63F 13/426 |
| | | | 463/32 |
| 2008/0311990 A1* | 12/2008 | Chiu | A63F 13/06 |
| | | | 463/37 |
| 2010/0273131 A1* | 10/2010 | Lim | F41A 33/02 |
| | | | 434/21 |

* cited by examiner

SIMULATED GUN SHOOTING AND TARGET POSITION SENSING APPARATUS AND METHOD

CROSS REFERENCE TO RELATED APPLICATION

This application claims the benefit of U.S. Provisional Application No. 61/826,213 filed on May 22, 2013, entitled "Safe Gun and Target Apparatus." The above identified patent application is herein incorporated by reference in its entirety to provide continuity of disclosure.

BACKGROUND OF THE INVENTION

Field of the Invention

The present invention relates to gun shooting practice devices. More specifically, the present invention relates to target shooting apparatuses that are adapted to dynamically update the position of the transmitting unit, i.e. the gun, and calculate a realistic bullet trajectory.

Electronic simulated gun shooting and target devices are useful for a wide range of purposes, including practicing shooting weapons in a safe and controlled environment and playing competitive video games with other individuals located both proximately to the user and distantly via networked communication. Although simulated gun shooting and video game applications are specifically discussed as potential applications for the presently disclosed technology, the disclosure should not be interpreted to be limiting in any way. The present invention may be utilized for any application requiring an infrared transmitter to wirelessly control the location of a cursor on a display panel.

Electronic simulated gun shooting and target devices are known in the prior art. These devices generally comprise electronic gaming devices that simulate shooting, or other such actions, in the video game by using a serial communication means, such as USB, to power and provide data to a device, such as a controller that effectively simulates the actions of a gun, which transmits an infrared signal to the target. These prior art devices are effective for tracking the movement of the signal transmitter on the display screen, but are ineffective at calculating the distance between the sensor unit and the transmitter. Because these systems are unable to calculate how far away the transmitter is, they are unable to generate an accurate simulation of depth between the user and the target and are also unable to calculate a simulated projectile trajectory that accounts for the drop off that launched projectiles experience. Therefore, these prior art devices are unable to generate a realistic simulation of shooting a firearm that is consistent with the way that projectiles behave in real life firing situations. Furthermore, prior art devices require a fixed arrangement of the sensors, which precludes the user from orienting the sensors as he or she sees fit to best accommodate the area in which the device is being set up.

The present simulated target shooting device and method comprises a target display screen, a plurality of sensors arranged about the display screen, receiver circuitry connecting the sensors and the display screen together, and a transmitter unit. The receiver circuitry calculates the distance between the transmitter unit and each of the sensors and is thereafter able to use these calculated values to display and plot a proper simulated of a simulated projectile fired from a simulated firearm, as represented by the transmitter unit. The transmitter unit continually emits a signal that is both carrier modulated and modulated with an intensity variation that the receiver system is adapted to detect and utilize to calculate the distance between the transmitter unit and the sensors disposed around the periphery of the target display screen. Because the transmitter unit continuously emits a signal stream, the present system is able to continuously track the three-dimensional location of the transmitter unit. Whenever the user actuates the transmitter unit to "fire" the simulated firearm, the transmitter unit circuitry modulates the signal stream with a "fire" signal that is detectable by the receiver system. The transmitter unit further automatically modulates the emitted signal stream with a unique gun identification tag that is also detectable by the receiver system, thereby allowing the receiver system to differentiate between multiple individuals utilizing multiple separate transmitter units with the same display screen. The present invention further comprises a means to wirelessly transmit the tracked gun data to other such devices so that multiple individuals can compete against each other in shooting and other such video games from remote locations.

Description of the Prior Art

Devices have been disclosed in the prior art that relate to simulated target shooting devices. These include devices that have been patented and published in patent application publications. These devices generally relate to systems including an imaging taking means that calculates the changing position of a target based upon differences in the location of the target in successive images or a device that transmits a signal or light that is tracked and has its position calculated by a series of complementary sensors. The following is a list of devices deemed most relevant to the present disclosure, which are herein described for the purposes of highlighting and differentiating the unique aspects of the present invention, and further highlighting the drawbacks existing in the prior art.

One such device is U.S. Pat. No. 4,395,045 to Baer, which discloses a simulated shooting device for use with a television. Baer functions by flashing the television screen in response to the trigger of the simulated gun being pulled. This flashing allows the optical sensor disposed on the gun to detect a portion of one or more raster scan lines, which ultimately allows for the vertical and horizontal position of the point at which the gun is pointed on the television screen to be detected and displayed. The system in Baer is only capable of determining the x and y coordinates of the point at which the simulated gun is pointing on the television screen when the gun's trigger is pulled; at all other times the gun is "invisible" to the system. The presently disclosed system, on the other hand, continuously monitors the physical location of the IR transmitter, i.e. the gun, therefore the point at which the gun is being aimed is consequently continuously tracked. Furthermore, the present system is also capable of determining the three-dimensional location of the IR transmitter, rather than merely the two-dimensional point on the screen at which the gun is pointed as in Baer.

Another such device is U.S. Pat. No. 6,323,838 to Thanasack et al., which discloses a similar system to Baer in which the photosensitive gun apparatus is able to detect horizontal and vertical synchronization signals from the output display. By detecting these signals, the Thanasack device is thereby able to calculate the position on the screen at which the photosensitive peripheral is being pointed. Like Baer, Thanasack lacks a means for the system to detect the actual three-dimensional location of the gun itself and instead is only capable of determining the two-dimensional point on the display screen at which the gun is pointed.

U.S. Pat. No. 6,540,607 to Mokris et al. discloses a video game position and orientation detection system comprising a targeting device with a plurality of infrared transmitters or photodiode receivers disposed thereon, a plurality of complementary receivers capable of detecting the signals from the transmitters, and receiver circuitry connected to the receivers. The receiver circuitry is adapted to determine the distance between the targeting device and the various receivers and is thereby able to determine the three-dimensional location and orientation of the transmitter. The present invention, on the other hand, further comprises a wireless module through which the target location may be transmitted to a remotely located display device and/or computer.

Another such device is U.S. Pat. No. 6,929,548 to Wang, which discloses a method and device for providing realistic simulated shooting input, comprising a mock gun peripheral with at least one light source affixed thereto, a screen for displaying the location of the peripheral's target, and a video camera that captures images of the mock gun peripheral. Wang calculates the location of the gun peripheral based upon the captured video images and feeds that location to the computer software. Unlike Wang, the present invention utilizes a plurality of photosensors to track the location of the transmitter, which continuously emits IR light. Each of the present photsensors is able to calculate the distance between itself and the transmitter and it relays that information to the receiver circuitry, which is then able to triangulate the precise three-dimensional location of the transmitter.

Another such device is U.S. Pat. No. 8,157,651 to Ohta et al., which, similarly to Wang, discloses a system that tracks the location of a target using an image recording device. Ohta calculates the location of the target and thereafter changes the orientation of a rotation means in accordance with the calculated movement vector of the target. As with Wang, the present invention utilizes an IR transmitter, a plurality of sensors that detect the IR signal and calculate the distance between themselves and the transmitter, and receiver circuitry that is adapted to calculate the three-dimensional location of the transmitter based on the variable distances between the transmitter and the sensors. The present invention does not utilize an image calculation means nor a means for calculating location changes in successively captured images of a target.

U.S. Pat. No. 8,164,567 to Barney et al. discloses a wireless input device for playing an interactive motion-sensitive game in which the user affects the virtually-represented environment by manipulating the input device. The input device comprises a wireless transceiver and motion-sensitive circuitry so that any changes in the orientation of the input device can be immediately communicated to the receiver circuitry. The present invention does not utilize a direct wireless connection with a wireless-compatible game console, but rather continuously emits an IR signal, which is detected by a plurality of sensors. Furthermore, is adapted to serve as a shooting simulation, not as a means by which the user can shake, twist, or otherwise manipulate the transmitter unit to advance through the game world.

The present invention provides a simulated gun shooting and target sensing apparatus comprising a transmitter unit having at least one IR transmitter, a target screen, a plurality of photodiode sensors disposed in a spaced apart relationship about the target screen, and receiver circuitry connecting the photodiode sensors together. Each of the photodiode sensors is adapted to calculate the distance between themselves and the transmitter unit, which allows the receiver circuitry to in turn calculate the three-dimensional position of the transmitter unit. Once the three-dimensional position of the receiver unit is calculated, a corresponding target location at which the transmitter unit is aimed may be calculated and displayed on a screen connected thereto. The connection between the display screen and the receiver circuitry may be either a direct connection or may be a wireless connection transmitted through a wireless module to a remotely located display device or computer. The transmitter unit of the present invention operates in two distinct modes: a "hover" or "browse" mode and a "shoot" mode. In the "hover" or "browse" mode, the transmitter unit continuously transmits an IR signal, which is detected by the sensors, thereby allowing the present invention to continuously track the three-dimensional location of the transmitter unit in real-time. In the "shoot" mode, the transmitter unit alters the output of its IR signal to signify that the user has depressed the trigger on the transmitter unit. This altered output may be provided in a number of different methods, including changing the packet update rate of the IR signal or sending different packets with an altered preamble as compared to the packets continuously transmitted during the "hover" mode. It substantially diverges in design elements from the prior art and consequently it is clear that there is a need in the art for an improvement to existing simulated gun shooting devices. In this regard the instant invention substantially fulfills these needs.

SUMMARY OF THE INVENTION

In view of the foregoing disadvantages inherent in the known types of simulated targeting shooting devices now present in the prior art, the present invention provides a new simulated target shooting device wherein the same can be utilized for providing convenience for the user when practicing shooting various types of guns and having the information either dynamically displayed on the target screen or wirelessly transferred to and shared with other individuals.

It is therefore an object of the present invention to provide a new and improved simulated target shooting device that has all of the advantages of the prior art and none of the disadvantages.

It is another object of the present invention to provide a simulated target shooting device that dynamically tracks the position of the transmitter unit.

Another object of the present invention to provide a simulated target shooting device that registers the shot without requiring that a confirmation signal be transmitted back to the transmitter unit.

Another object of the present invention is to provide a simulated target shooting device that dynamically calculates realistic bullet trajectories based upon the position of the transmitter unit.

Yet another object of the present invention is to provide a simulated target shooting device that does not require that the signal receiving sensors be disposed in a specific arrangement or orientation around the target screen.

Yet another object of the present invention is to provide a simulated target shooting device that dynamically displays the distance-adjusted location of the transmitter unit in real-time on a target screen.

Still yet another object of the present invention is to provide a simulated target shooting device that is able to wirelessly transmit the distance-adjusted location of the transmitter unit to other such simulated target shooting devices.

Still yet another object of the present invention is to provide a simulated target shooting device that transmits a simulated trigger pull from the transmitter unit to the photodiode sensors by altering the packet update rate of the transmitter unit.

Still yet another object of the present invention is to provide a simulated target shooting device that transmits a simulated trigger pull from the transmitter unit to the photodiode sensors by transmitting different packets with an updated preamble.

Another object of the present invention is to provide a simulated target shooting device that may be switched between a passive "hover" mode and a "firing" mode.

Another object of the present invention is to provide a simulated target shooting device that is able to provide users with a dynamic range of operation by altering the simulated depth of the provided targets.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
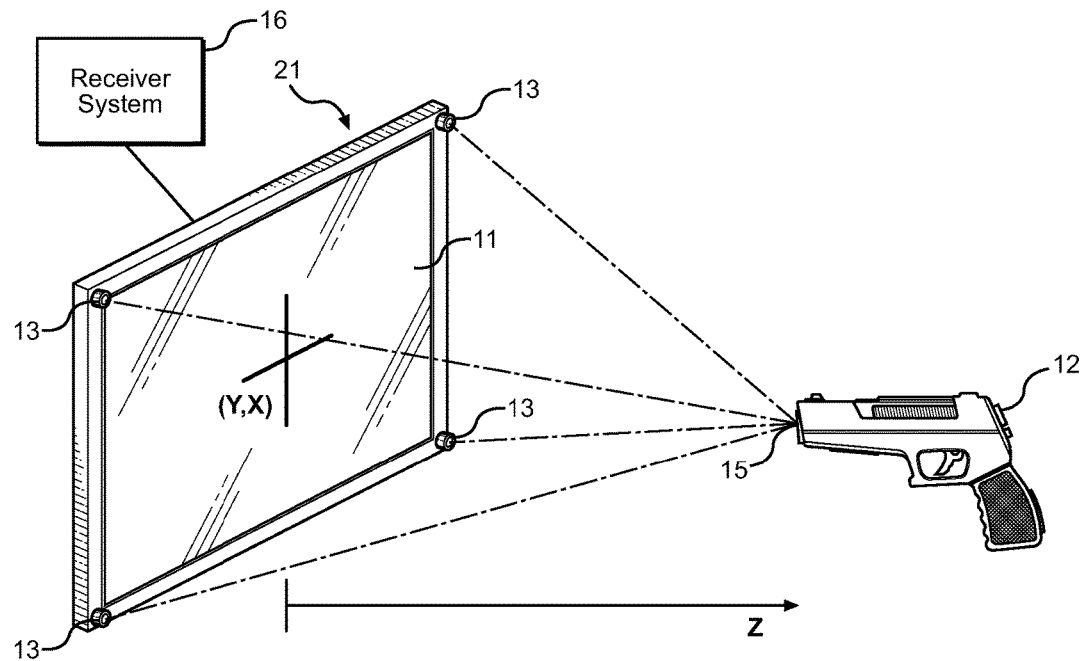
FIG. 1 is a diagram view of the present invention, including the aiming vector positioning system.

Reference is made herein to the attached drawings. Like reference numerals are used throughout the drawings to depict like or similar elements of the simulated dynamic target shooting. For the purposes of presenting a brief and clear description of the present invention, the preferred embodiment will be discussed as used for simulating shooting a gun, represented by a transmitter unit, in a video game at a simulated downrange target, depicted on a target screen. However, one skilled in the art will recognize that the presently disclosed system and method have applications beyond only the context of a video game. The figures are intended for representative purposes only and should not be considered to be limiting in any respect.

Referring now to FIG. 1, there is shown a diagram view of the present invention, including the aiming vector positioning system. The present invention comprises a planar target screen 11, a plurality of photodiode sensors 13 disposed about the display screen, a transmitter unit 12, and a receiver system 16 connecting the plurality of sensors 13 together. In one embodiment of the present invention the sensors 13 are separate from the target screen 11 and may be freely disposed around the target screen 11 in any symmetric orientation within the plane of the target screen 11 as desired by the user. In another embodiment of the present invention the sensors 13 are integrally affixed about the target display 11 in a frame or are arranged along the periphery of a computer or television screen. The plurality of sensors 13 together defined a sensor array 21 that is capable of continuously tracking the three-dimensional location of the transmitter unit 12 and communicating said location with the receiver system 16. The sensors 13 comprise any type of photodiode sensors commonly known in the prior art, such as Vishay Intertechnology model TSSP4038, that is receptive to 38 KHz of modulated near-band IR light with a wavelength of 950 nm.

Although the specific location of the sensors 13 is configurable for each embodiment of the present invention, they are preferably arranged in a symmetric orientation within the plane of the target display 11 in order to accurately calculate the position of the transmitter unit 12. In one embodiment of the present invention, as depicted, the sensor array 21 is disposed in a substantially rectangular orientation about the target display 11 with each of the sensors 13 located at a corner of the rectangle. In other embodiments of the present invention, the sensor array 21 may be organized in any other planar geometric shape that is symmetrical and allows for a coordinate-based calculation of vector aiming on a targeting system. However, the sensors 13 need not be disposed at set or known lengths between each other. The sensors 13 may be disposed at variable or unknown distances between each other, as long as they are within the same plane, because the receiver system 16 is adapted to calibrate the present invention's sensor array 21 using a set target set at a known length from the sensor array 21. The present invention is thereby able to calibrate its vector aiming system. Therefore, other sensor 13 orientations and distance between the receivers may be used by calibrating the system in the way herein described.

As depicted, the transmitter unit 12 comprises a peripheral that is designed to simulate the general shape and appearance of a firearm. However, no claim is made as to the shape or design of the transmitter unit 12 housing and the depictions contained herein are solely intended to be exemplary. The transmitter 12 unit comprises an emitter 15 generally disposed on the front portion of the transmitter unit 12. The emitter 15 wirelessly transmits a pulsed signal that is received by the sensor array 21, which is then transmitted to the CPU embedded with the receiver system 16 for further processing. Alternatively, the transmitter unit 12 may be directly tethered to the receiver system 16; however, no direct connection between the two components is explicitly necessary for the present invention to function and the present invention preferably functions wirelessly. Further alternatively, although the depicted embodiment describes the emitter 15 as being mounted on the front portion of the transmitter unit 12 and the sensor array 21 as being mounted in a housing about the target display 11, other embodiments of the present invention may reverse the above-described emitter-sensor configuration and instead comprise emitters mounted on the housing around the target display 11 and sensors mounted on the transmitter unit 12. No claim is made as to the precise location or configuration of the IR emitter or emitters and the complementary sensors.

Figure 2:
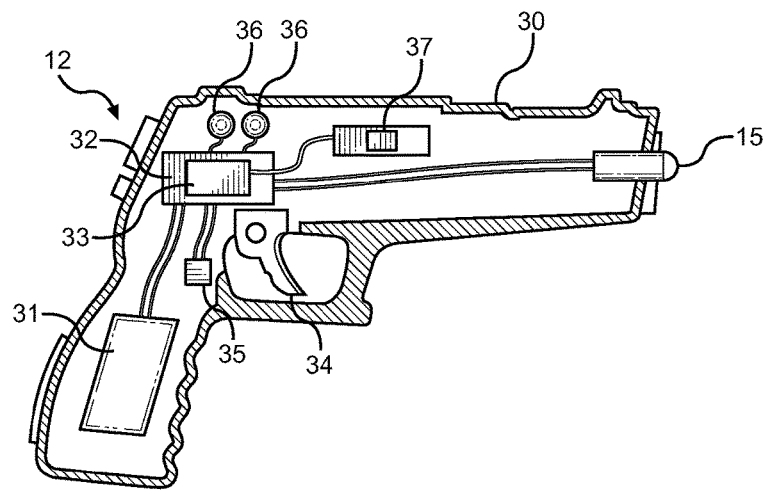
FIG. 2 is a diagram of the transmitter unit signal transmitting system.

Referring now to FIG. 2, there is shown one embodiment of the transmitter unit 12, which comprises a housing 30 containing a battery 31, a unit circuit 32, a CPU 33, a trigger 34 that controls a trigger switch 35, at least one LED indicator 36, and a mode switch 37, in addition to the emitter 15. The battery 31 generates the energy that powers the various electrical components of the transmitter unit 12, including the unit circuit 32, LED indicators 36, the trigger switch 35, and the emitter 15. The depicted embodiment of the transmitter unit 12 utilizes a single emitter 15, which relays a signal that is detected by the various sensors of which the sensor array is composed. The emitter 15 preferably comprises an LED adapted to transmit a pulsed IR signal that is modulated by the transmitter unit's 12 circuit 32 and CPU 33. In an alternative embodiment of the present invention, the emitter 15 comprises a laser, rather than an IR LED. The battery 31 comprises a rechargeable or replaceable electrical power-providing unit as is commonly known in the prior art. The transmitter unit 12 preferably does not rely upon an external power source and is preferably untethered, relying instead solely on wireless communication of signals between itself and the sensor array.

The emitter 15 is preferably disposed on the central tip of the transmitter unit 12 barrel in order to most closely mimic the position at which the user is aiming on the target display. In embodiments of the present invention wherein the emitter 15 is an IR LED, the emitter 15 may comprise any known IR LED commonly known in the prior art, such as the Vishay TSAL6100, that is adapted to generate an IR signal with the enough strength and with a consistent beam width as required by the present invention. The beam width is generally substantially equal to eighteen degrees measured relative to the vector of the emitter 15 lens; however, the beam width could be wider or narrower in other circumstances.

In another embodiment of the present invention, the transmitter unit 12 comprises an additional calibrating laser disposed thereon. The calibrating laser improves the accuracy of the aiming vector of the transmitter unit 12, as calculated by the signal receiving and processing system. The transmitter unit 12 emitter 15 and the calibrating laser are disposed a predetermined distance from each other and in a predetermined orientation that are both known of the signal receiving and processing system. The calibrating laser is thereby able to act as a second reference point for the sensor array to detect and calculate the position of the transmitter unit 12. Any error associated with having only a single reference point, i.e. the emitter 15, for the sensor array to detect is thereby reduced and the overall efficiency of the present system is improved.

Figure 3:
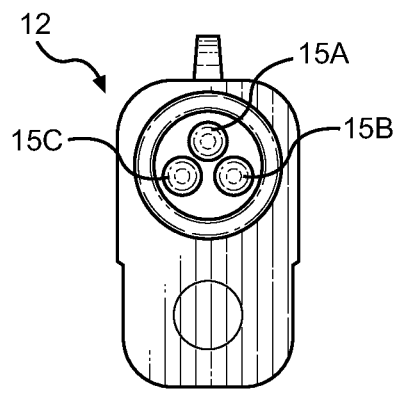
FIG. 3 is a view of the barrel of the transmitter unit of an alternative embodiment of the present invention, wherein the transmitter unit has multiple signal transmitters, rather than a single signal transmitter.

Referring now to FIG. 3, there is shown a view of the barrel of the transmitter unit of an alternative embodiment of the present invention, wherein the transmitter unit has multiple signal transmitters, rather than a single signal transmitter. In yet another embodiment of the present invention, the transmitter unit 12 utilizes multiple separate IR emitters 15A, 15B, 15C, rather than a single IR emitter as depicted above. Multiple IR emitters 15A, 15B, 15C provide multiple points of reference for the signal array to detect, thereby increasing the accuracy of the present system in detecting the three-dimensional position of the transmitter unit 12.

Figure 4:
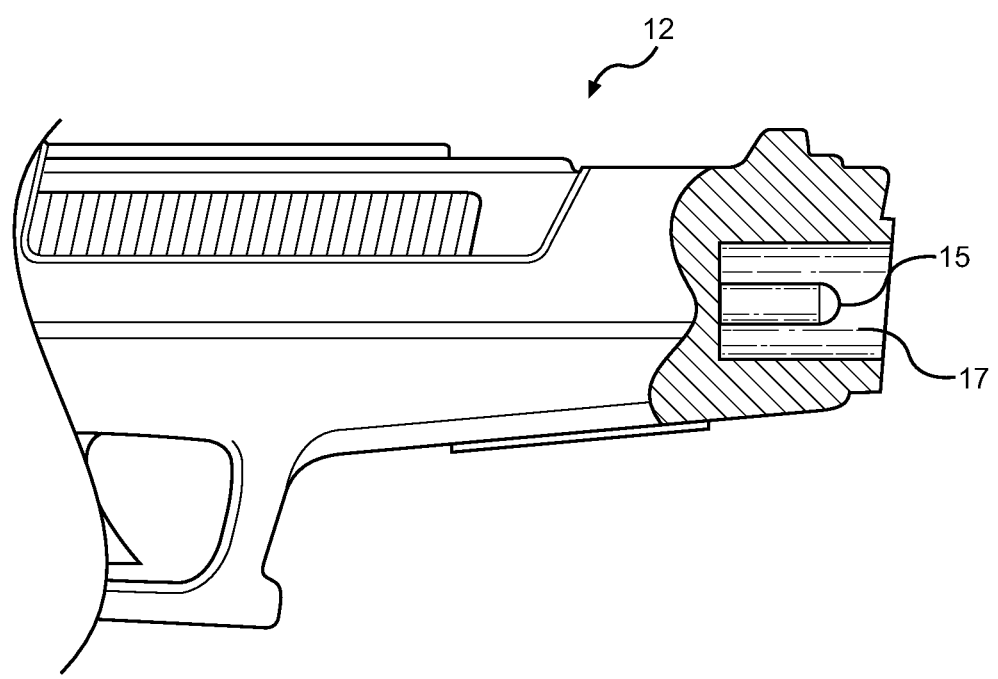
FIG. 4 is a cross-sectional side view of the barrel of the transmitter unit of an alternative embodiment of the present invention, wherein the signal transmitters sit within beveled recesses.

Referring now to FIG. 4, there is shown a cross-sectional side view of the barrel of the transmitter unit of an alternative embodiment of the present invention, wherein the signal transmitters sit within beveled recesses. In this embodiment of the present invention, the emitter 15 is positioned within a beveled recess 17. The recess 17 disposed on the transmitter unit 12 has sufficient depth to prevent individuals or objects from making contact or otherwise interfering with the emitter 15. However, the recess 17 is not so deep so as to cause the signal generated from the emitter 15 to reflect off of the interior walls of the recess 17 and interfere with propagation of the signal or the spread of the transmitted signal. Embodiments of the present invention having multiple emitters, as discussed above, may have multiple independent recesses for each of the emitters.

Figure 5:
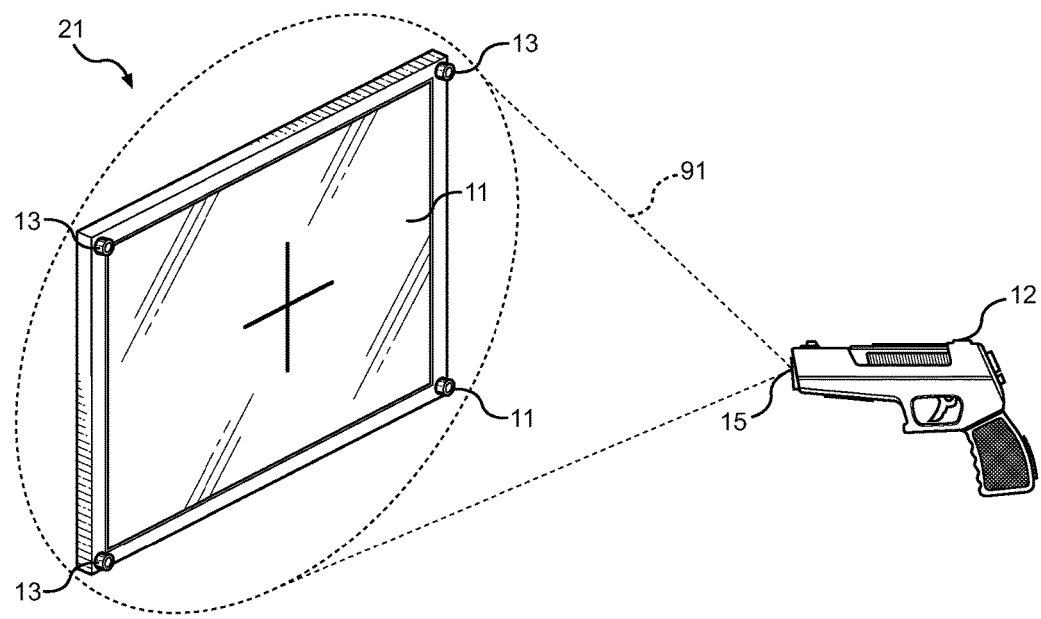
FIG. 5 is a diagram view of the signal emitted from the transmitter unit impinging upon the sensor array disposed about the periphery of the target display screen.

Referring now to FIG. 5, there is shown a diagram view of the signal emitted from the transmitter unit impinging upon the sensor array disposed about the periphery of the target display screen. The depicted embodiment of the present invention utilizes an emitter 15 that transmits an IR signal 91. The emitter 15 transmits the IR light radiation in a roughly conical beam shape, wherein the signal gradually spreads out from the point of generation and has an increasing cross-sectional area against which the signal bears. As the generated beam spreads out, the intensity of the light signal decreases because it is spread over an increasingly large area. This difference in signal intensity is detectable by the plurality of sensors 13 making up the sensor array. The detected signal intensity is translated into an electrical signal, which is transmitted to the signal processing system 16. The signal processing system is adapted to then determine the distance between the transmitter unit 12 and the sensor array 21 based upon the intensity measurement communicated thereto. As each of the plurality of sensors 13 making up the sensor array 21 is able to independently determine the distance between themselves and the transmitter unit 12, the signal processing system 16 is then able to calculate the three-dimensional position of the transmitter unit 12 based upon the differences in the calculated distances and the known distances between the various sensors 13.

Furthermore, because the IR signals spread from their point of generation, the sensor array 21 can also determine when the transmitter unit 12 is not aiming directly at the target display 11, which is a substantial advantage over many prior art systems. The present system is thereby able to determine the aiming vector of the transmitter unit even when the device is pointed off-screen because the receiver system is able to recognize when the pulsed signal stream is not impinging upon all of the sensors 13 and compensate for that fact. The conical, gradually expanding shape of the pulsed signal stream extends over a more expansive area than the strict point at which the user is aiming, thereby allowing the transmitter unit 12 to be detected even when the point at which the transmitter unit 12 is being aimed is not directly at the target display screen 11 or the sensor array 21 and is instead not aligned therewith.

The emitters 15 transmit a modulated IR light signal over a tightly controlled bandwidth. In one embodiment of the present invention, the emitters 15 transmit a square wave signal with a fifty percent duty at a carrier frequency between 38 KHz to 56 KHz. However, no claim is made as to the precise type of signal or frequency emitted by the transmitter unit 12. The CPU 34 is adapted to detect actuation of the trigger 33 and alters the signal transmitted by the emitters 15. Each signal pulse generated by the CPU 34 in response to the trigger 33 being pulled causes the emitter 15 to output a synchronization pulse to alert the sensor array of a trigger 33 pull, an identification code unique to each transmitter unit 12 so that "shots" by different users can be separately identified, and a sequencing of ranging data. The sequencing of ranging data may be formatted as either a variation in the amplitude or the frequency of the basic signal transmitted by the emitters 15. The sensor array is adapted to detect this change in amplitude or frequency and relay that difference to the signal processing system so that the present invention can properly register "shots" from the transmitter unit 12 and act appropriately. The sensors relay this difference to the signal processing system via an electrical signal that is proportional to the amplitude or frequency difference between the basic signal and the modulated signal.

Figure 6:
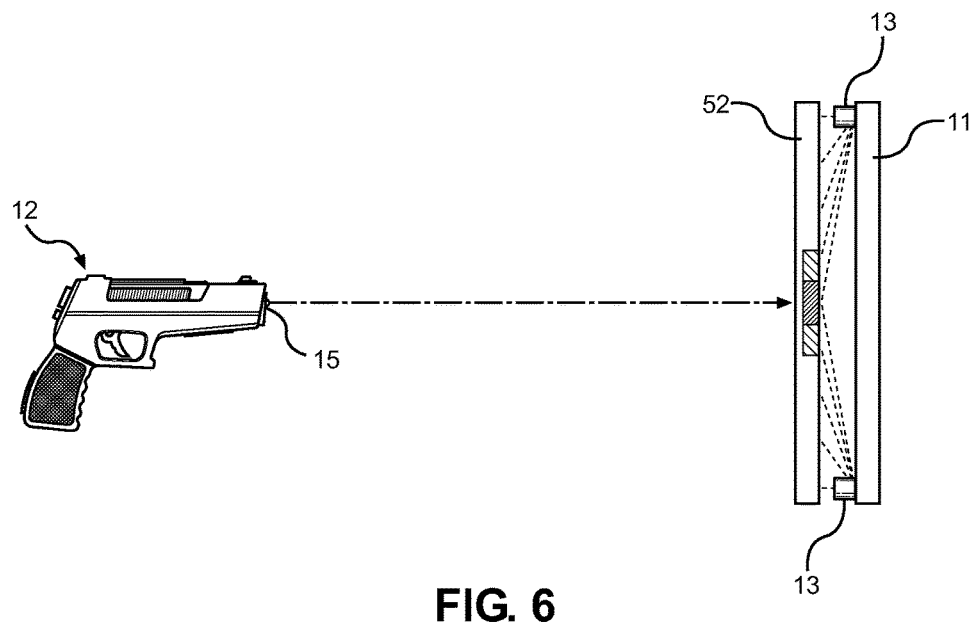
FIG. 6 is a view of an alternative embodiment of the present invention comprising a dispersive medium disposed before the target display screen and a transmitter unit having a laser emitter.

Referring now to FIG. 6, there is shown a view of an alternative embodiment of the present invention comprising a dispersive medium disposed before the target display screen and a transmitter unit having a laser emitter. In an alternative embodiment of the present invention, the emitter 15 comprises a laser emitter, rather than an IR emitter as described above. Laser emitters have tighter beam spreads and therefore require a diffusive screen 52 to be placed before the target display 11 to ensure that the generated signal is properly detected by the sensor array. The screen 52 is composed of transparent and diffusive material, which acts to diffuse the laser signal generated by the transmitter unit prior to it coming in contact with the target display 11. This diffused signal beam is then able to make contact with the plurality of sensors 13 disposed about the target display screen 11 so that the transmitter unit 12 can be detected by the sensor array.

Figure 7:
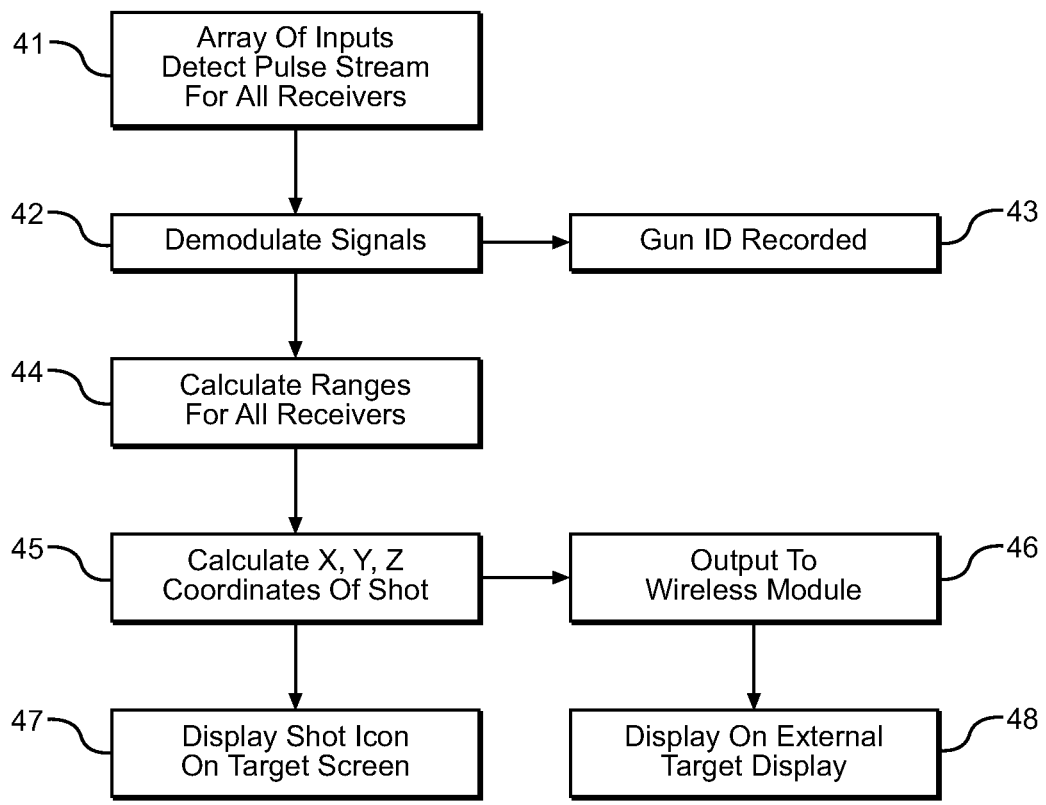
FIG. 7 is a flowchart of the signal receiving and processing system of the present invention.

Referring now to FIG. 7, there is shown there is shown a flowchart of the signal receiving a processing system of the present invention. The sensor array detects 41 signals generated from the emitter or emitters and is adapted to calculate 44 the position of the transmitter unit therefrom. The receiver system calculates 44 the position of the transmitter unit by demodulating 42 the detected 41 signals and extracting the positional data embedded therein. Demodulating 42 the detected 41 signal pulse stream further allows the present invention to extract and record 43 a unique gun ID that is embedded within the signal stream. Each transmitter unit has a unique ID associated with it that allows the present receiver system to differentiate between and independently track multiple different transmitter units simultaneously in use by multiple different users.

The present signal receiving system calculates the ranges 44 between the sensors and the emitter or emitters disposed on the transmitter unit and then uses each of these independently calculated values to triangulate 45 the three-dimensional position of the source of the signal, i.e. the emitter or emitters. In one embodiment of the present invention wherein the transmitter unit utilizes a single emitter and the sensor array comprises four sensors, the three-dimensional XYZ Cartesian coordinates of the transmitter's position are represented as:

$$X=Kx*(R1+R4-R2-R3),$$

$$Y=Ky*(R1+R2-R3-R4),$$

$$Z=Kz*(R1+R2+R3+R4),$$

wherein R1, R2, R3, and R4 are the measured pseudo-ranges measured at each of the sensors and Kx, Ky, and Kz are the calibration constants. In embodiments of the present invention utilizing multiple transmitters, the calculation is repeated for each of the transmitters. Multiple transmitters also allows the orientation angle of the transmitter unit to be calculated because the distance between the various transmitters is known and therefore the angle of the transmitter unit can be calculated based on the different calculated distances between the transmitter units and the various sensors, thereby generating a comparable series of aiming vectors. The pseudo-ranges are measured based upon the intensity of the signal stream as detected by each of the various sensors. The farther the emitter is from the sensors, the more the signal has spread out and thus intensity of the detected signal stream is lower. This detected lower intensity, when combined with the calibration constant for each of the sensors, allows the present invention to determine the real distance between the transmitter unit and the sensors. The above described embodiment of the present invention is intended to be merely exemplary and no claim is made as to the specific arrangement of emitters and sensors utilized by the present invention.

The sensors of the present invention may also be arranged to form a three-dimensional signal-receiving sensor array. An exemplary three-dimensional sensor array utilizes eight sensors disposed at each of the vertices of a cuboidal shape; however, no claim is made as to the precise arrangement of sensors for embodiments of the present invention utilizing a three-dimensional sensor array arrangement. Embodiments of the present invention utilizing the three-dimensional sensor array calculate the position of the transmitter unit based on the signal or signals detected therefrom utilizing a calculation based on the curvature of the radius of the transmitted signal or signals. Embodiments of the present invention utilizing eight sensors disposed in a three-dimensional array require a more complicated matrix mathematical solution to account for the fact that the three-dimensional position of the transmitter unit, as detected by the sensor array, is over-determined.

Once the three-dimensional position of the transmitter unit has been calculated 45, the present receiving system then calculates an aiming vector of a simulated projectile therefrom and displays 47 the shot icon representing the end of the aiming vector on the target screen. Furthermore, the present invention preferably comprises wireless transceiver that serves as an output module 46 from which the unique ID tag, transmitter unit positional data, and aiming data can then be uploaded to a remotely located complementary simulated gun shooting and target position sensing apparatus or another such electronic device for display on an external target display 48. The present system can therefore provide multiple remotely located individuals with the ability to simultaneously play a shooting video game by separately tracking each transmitter unit, detecting and recording the data associated with fired shots, and relaying both of the aforementioned sets of data to all of the connected devices via a wireless connection to create a seamless competitive or cooperative playing experience.

Figure 8:
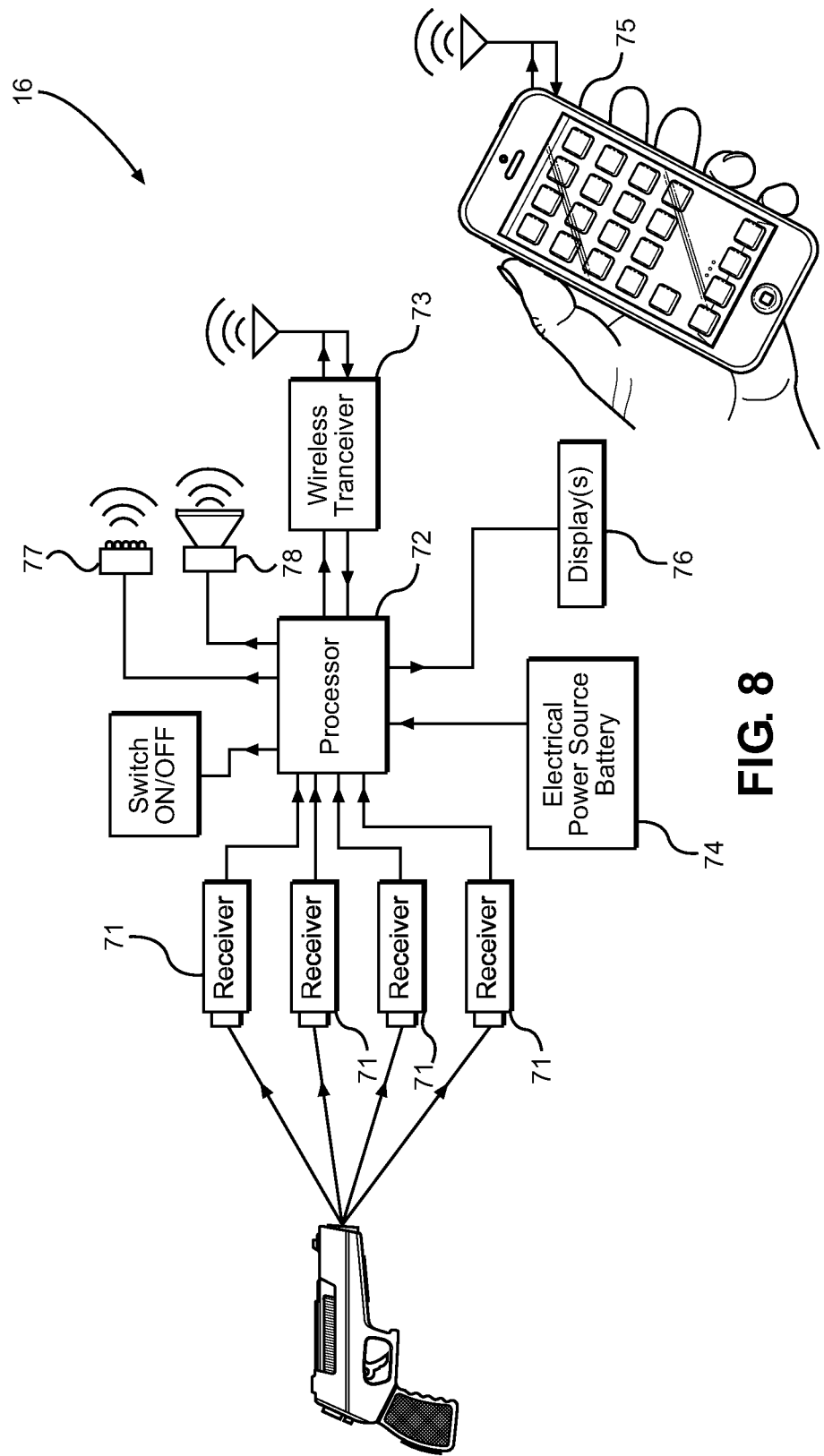
FIG. 8 is a flowchart of the target receiver system of the present invention.

Referring now to FIG. 8, there is shown a flowchart of the target receiver system of the present invention. The target receiver system receives the detected signal stream generated by the transmitter unit via the sensors 71, which are disposed about the periphery target display screen as discussed above, and then the detected signal is relayed to the CPU 72, at which point the detected signals are demodulated and the positional data and the unique ID tags are extracted therefrom and recorded. The CPU 72 then calculates the position of the transmitter unit and the aiming vector as discussed above. The CPU 72 then transmits these calculated positional values to the target display screen 76 (or a plurality of target display screens) to provide a means by which the user can visualize the position and effects of each "shot" that he or she takes. The ultimate effect of these shots within the video game is ultimately determined by the video game's programming and each video game can be programmed to react in unique ways to each shot. The present system can also provide remotely located individuals with a means to interact both competitively and cooperatively with each other in a video game environment. In addition to displaying the aiming data and the registering shots fired from the transmitter unit on the target display 76 that is disposed before the user, the calculate positional and aiming data can be wirelessly transmitted 73 to a complementary unit in use by another individual. The transmitted data is then displayed and registered on the other individual's target display screen 75, and vice-versa. Individuals can therefore play competitive shooting games or may cooperatively advance through a video game and have all of the relevant information, i.e. the location of both players, whether the players fire a shot, where that shot landed, the effect of the shot, and so on, displayed seamlessly and in a coordinated manner on both target display screens 75, 76.

Figure 9:
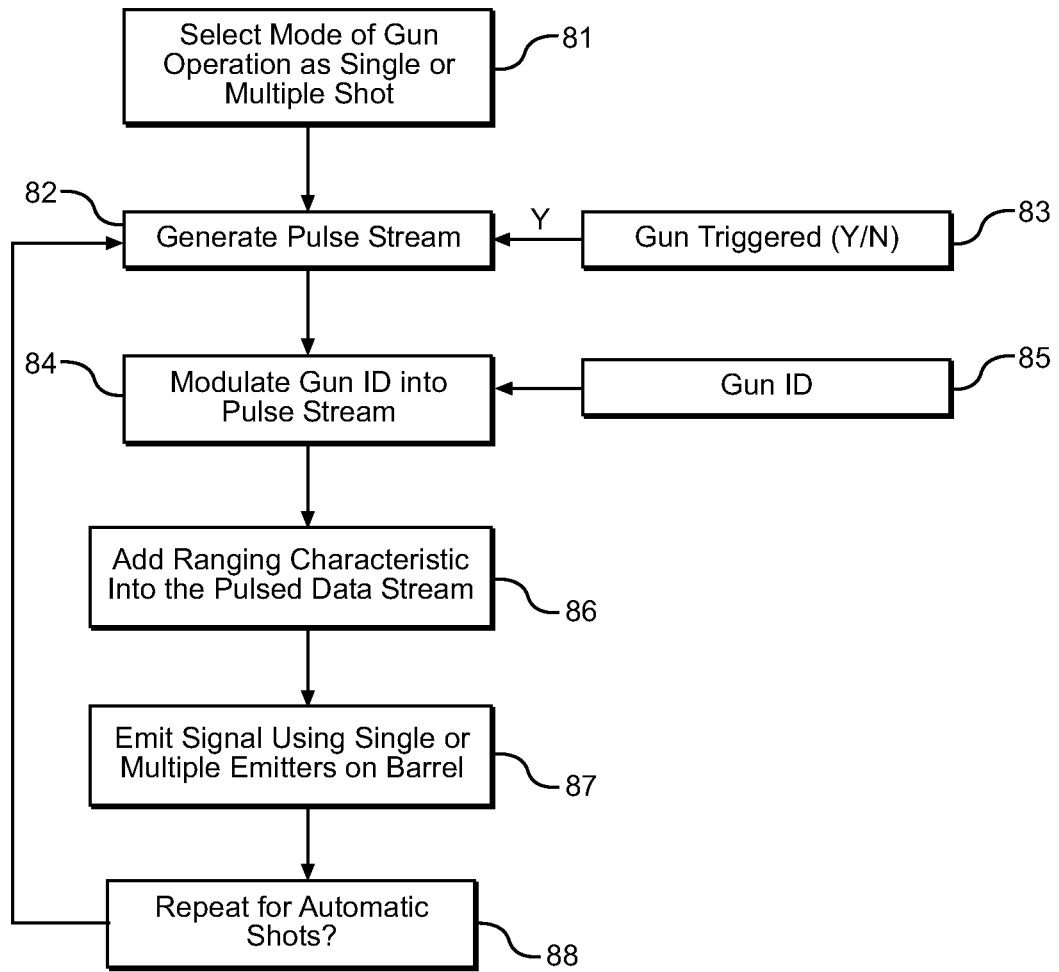
FIG. 9 is a flowchart of the transmitter unit system of the present invention.

Referring now to FIG. 9, there is shown a flowchart of the transmitter unit system of the present invention. The signal transmitting system of the transmitter unit comprises a means for multiplexing multiple identifying signals into a single carrier medium, i.e. the transmitted IR or laser signals generated by the transmitter unit. It is submitted that multiplexing signals into a single carrier medium is commonly known in the prior art and no claim is made herein to a particular method or means for signal multiplexing. The multiplexed signals transmitted via the carrier mediums contain an identifying signal unique to the given transmitter unit, thereby allowing the present system to separately identify multiple individuals utilizing multiple transmitter units with a signal display unit, while simultaneously calculating the aiming vectors for each individual transmitter unit. The present signal receiving and processing system is able to catalogue and index each of the received sets of data, i.e. the three-dimensional position of the given transmitter unit and the aiming vector of the given transmitter unit, so that it is uniquely associated with each of the disparate users. This prevents the present system from improperly crediting users with others users' aiming and shots with their own transmitter units.

To utilize the transmitter unit, the user first selects a mode 81 that the transmitter unit is to be operated in. The transmitter unit can be switched between a sleep, off, or invisible mode in which the transmitter unit is not emitting signals, a single or semi-automatic mode in which each trigger pull corresponds to a single shot being fired, and a multiple shot or automatic mode in which shots are continuously generated as long as the trigger is held down. The transmitter unit continuously generates 82 a pulse signal stream that is detectable by the sensors array, allowing the receiver system to continuously track the position of the transmitter unit at all times when it is in use, regardless of whether or not it is being used to fire shots at the time. The pulse stream is automatically modulated with a gun ID 84 in order to uniquely identify each transmitter unit from each other when multiple transmitter units are in use. Furthermore, when the transmitter unit is triggered 83, the pulse stream is further modulated with an indicator signal to alert the receiver system to the fact that the transmitter unit was fired. Finally, the pulsed signal stream is further modulated with the detected pseudo-ranges 86 between the transmitter unit and the sensors. These signals are then multiplexed together into a single carrier modulated signal that is emitted 87 from each of the emitters disposed on the barrel of the transmitter unit. This multiplexed signal is detectable by the sensor array and may then be demodulated by the receiver system. This process is repeated 88 if the device is in automatic mode 81 for as long as the trigger is held down, thereby causing the transmitter unit system to emit a continuous stream of signals that are modulated with the "shot fired" signal.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A simulated gun target and shooting system, comprising:
   a target display screen;
   a plurality of sensors disposed about said target display screen in a planar configuration;
   a transmitter unit having at least one emitter adapted to emit a pulsed light signal and a CPU, wherein said pulsed light signal is modulated with pseudo-ranges measured between the transmitter unit and the plurality of sensors, wherein each pseudo-range represents a distance between one of the plurality of sensors and the transmitter unit;
   a receiver system electrically connected to said sensors, wherein said receiver system is adapted to calculate the distance between said transmitter unit and said plurality of sensors by demodulating said pulsed light signal to obtain said pseudo-ranges;
   a processor adapted to calculate the three-dimensional position of the transmitter unit based upon said calculated distances;
   wherein said target display screen is adapted to display a shot icon, wherein the position of said shot icon on said target display screen is based upon the calculated three-dimensional position of the transmitter unit.

2. The simulated gun target and shooting system of claim 1, further comprising:
   a trigger disposed on said transmitter unit;
   wherein said transmitter unit CPU is adapted to modulate said pulsed light signal with an identifier signal upon actuation of said trigger.

3. The simulated gun target and shooting system of claim 1, wherein said at least one emitter emits IR light.

4. The simulated gun target and shooting system of claim 1, wherein said at least one emitter is disposed within a recess on said transmitter unit.

5. The simulated gun target and shooting system of claim 1, wherein said transmitter CPU modulates said pulsed light signal with a unique ID tag.

6. The simulated gun target and shooting system of claim 1, further comprising:
   a wireless transceiver, wherein said wireless transceiver is adapted to transmit said transmitter unit three-dimensional position to other electronic devices.

7. The simulated gun target and shooting system of claim 6, further comprising:
   a trigger disposed on said transmitter unit;
   wherein said transmitter unit CPU is adapted to modulate said pulsed light signal with an identifier signal upon actuation of said trigger;
   wherein said wireless transceiver is adapted to transmit said identifier signal to other electronic devices.

8. The simulated gun target and shooting system of claim 1, wherein said sensors are disposed about the target display screen in a symmetrical configuration.

9. The simulated gun target and shooting system of claim 1, wherein said sensors are disposed about the target display screen in a configuration corresponding to the vertices of a triangle.

10. The simulated gun target and shooting system of claim 1, wherein said sensors are disposed about the target display screen in a configuration corresponding to the vertices of a rectangle.

11. A method of tracking and displaying the position of a targeting device relative to a display monitor, comprising the steps of:
    emitting a pulsed light signal from a transmitter unit comprising an emitter, wherein said pulsed light signal is modulated with pseudo-ranges measured between the transmitter unit and the plurality of sensors, wherein each pseudo-range represents a distance between one of the plurality of sensors and the transmitter unit;
    detecting said pulsed light signal via a plurality of sensors disposed about said display monitor;
    calculating the distance between said transmitter unit and each of said sensors by demodulating the pulsed light signal and extracting the pseudo-ranges therefrom;
    calculating a position of said transmitter unit based upon the differences between each of the calculated distances;
    calculating shot position based upon the calculated position of the transmitter unit;
    displaying a shot icon on said display monitor at a position corresponding to said shot position.

12. The method of tracking and displaying the position of a targeting device relative to a display monitor of claim 11, further comprising the steps of:
    modulating said light signal with a unique identification tag.

13. The method of tracking and displaying the position of a targeting device relative to a display monitor of claim 12, further comprising the steps of:
    wirelessly transmitting said position, aiming vector, and unique identification tag data to another electronic device for simultaneously display thereon.

14. The method of tracking and displaying the position of a targeting device relative to a display monitor of claim 11.

15. The method of tracking and displaying the position of a targeting device relative to a display monitor of claim 11, wherein said transmitter unit comprises a plurality of emitters units, and further comprises:
    calculating an orientation of said transmitter unit.

16. A simulated gun target and shooting system, comprising:
    a target display screen;
    a diffusive screen disposed before said target display screen;
    a plurality of sensors disposed about said target display screen in a planar configuration;
    at least one transmitter unit having at least one emitter adapted to continuously emit a pulsed light signal and a CPU, wherein said pulsed light signal is modulated with pseudo-ranges measured between said transmitter unit and the plurality of sensors, wherein each pseudo-range represents a distance between one of the plurality of sensors and said transmitter unit;
    wherein said diffusive screen is adapted to diffuse said pulsed light signal so that they impinge upon said sensors;
    a receiver system electrically connected to said sensors, wherein said receiver system is adapted demodulate the pulsed light signal in order to calculate the distance between said transmitter unit and sensors based upon the pseudo-ranges applied when the pulsed light signal is modulated;
    a processor adapted to calculate the three-dimensional position of the transmitter unit based upon said calculated distances;
    wherein said target display screen is adapted to display a shot icon, wherein the position of said shot icon on said target display screen is based upon the calculated three-dimensional position of the transmitter unit.

17. The simulated gun target and shooting system of claim 16, further comprising:
    a trigger disposed on said transmitter unit;
    wherein said transmitter unit CPU is adapted to modulate said pulsed light signal with an identifier signal upon actuation of said trigger.

18. The simulated gun target and shooting system of claim 16, further comprising:
    a wireless transceiver, wherein said wireless transceiver is adapted to transmit said transmitter unit three-dimensional position to other electronic devices.

19. The simulated gun target and shooting system of claim 18, further comprising:
    a trigger disposed on said transmitter unit;
    wherein said transmitter unit CPU is adapted to modulate said pulsed light signal with an identifier signal upon actuation of said trigger;
    wherein said wireless transceiver is adapted to transmit said identifier signal to other electronic devices.

20. The simulated gun target and shooting system of claim 16, wherein said transmitter unit CPU modulates said pulsed light signal with a unique ID tag.

* * * * *